March 18, 1924.
S. M. KASS
1,487,337
PIPE REPAIR CLAMP
Filed Aug. 13, 1921
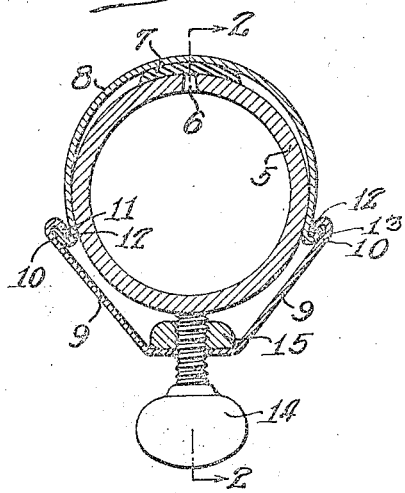
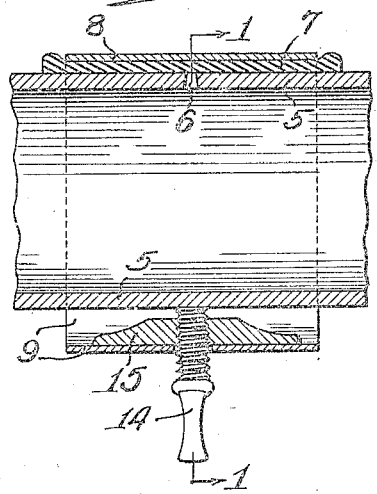
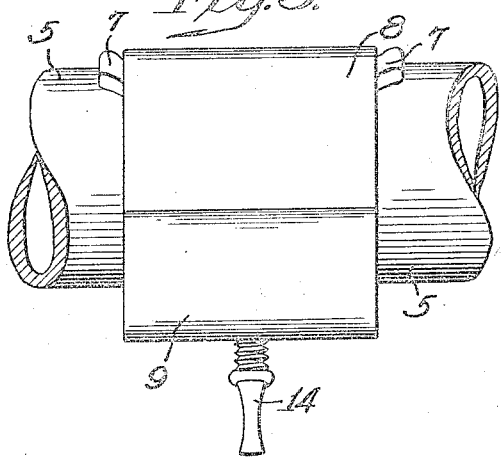
Inventor.
Samuel M. Kass, Patented Mar. 18, 1924.

1,487,337

UNITED STATES PATENT OFFICE.

SAMUEL M. KASS, OF PHILADELPHIA, PENNSYLVANIA.

PIPE-REPAIR CLAMP.

Application filed August 13, 1921. Serial No. 491,961.

*To all whom it may concern:*

Be it known that I, SAMUEL M. KASS, a citizen of the United States, residing at Philadelphia, in the county of Philadelphia and State of Pennsylvania, have invented a certain new and useful Pipe-Repair Clamp, of which the following is a specification.

My invention relates to clamps of the kind that are used to repair leaks in metal pipe.

The main purpose of my invention is to provide a clamp largely of sheet metal construction having longitudinally extending interfitting parts adapted for quick, easy and effective assemblage and use.

A further purpose is to provide for easy assemblage with clincher engagement at both edges between sheet metal interfitting clamp parts.

Further purposes will appear in the specification and in the claims.

I have illustrated my invention by but one form, selecting a form which has proved to be practical, efficient and very inexpensive and which at the same time well illustrates the principles of my invention.

Figure 1 is a transverse section upon line 1—1 of Figure 2, showing pipe to which my invention is applied.

Figure 2 is a section upon line 2—2 of Figure 1.

Figure 3 is a side elevation of the structure seen in Figures 1 and 2.

In the drawings similar numerals indicate like parts.

In the repair of breaks in pipe, clamps have long been placed about the break to clamp packing over it. My invention is intended to provide a clamp lighter and less expensive than those now available, yet one equally strong and equally easy to assemble. I do this by the use of sheet metal. However, my invention does no reside in the substitution of sheet metal for other metal, but in the construction by which sheet metal is rendered economical and effective.

In the illustration, the pipe 5 is shown as having a break at 6, which is to be repaired by clamping a strip of packing 7 over the break.

I use a clamp made up of two main parts 8 and 9, preferably of equal length and together completely encircling the pipe and interfitting by clincher joints at opposite sides. These clincher joints are formed by reversely turning the metal of the member 8 at 10 to provide spaces 11 within which the reversely turned edges 12 of the member 9 fit, at the same time that the ends 10 fit within spaces 13 formed by the reverse turning of the edges 12.

The two clamp members may divide the circumference in any proportion desired which will permit the clincher joints to function properly and will not bring a point of division over the packing which is being applied. It is quite desirable to locate the middle of the member 8 over the packing in order that there may be as much pressure brought upon the packing as possible and that it may be uniformly distributed over the surface of the packing.

I show the two clamp members as tightened by a screw and nut construction, in which the thumb screw 14 passes through a nut 15 within the middle of the interior of the member 9. The nut member 15 may vary in shape. Preferably, it may have the same length, approximately, as the clamp member 9, so as to distribute its pressure uniformly along that member and it may be tapered to reduce weight and facilitate assemblage.

After the parts are in position, but before the screw is tightened, greater strength may be given the joints, when desired, by closing them laterally, by pressure or impact.

I recognize that my invention may be applied in various modifications and is not confined to the exact form shown. I purpose covering in my claims all such modified forms as come within the reasonable spirit and scope of my invention.

Having thus described my invention, what I claim as new and desire to secure by Letters Patent is:

1. In a pipe repair clamp, two clamp members united by clincher joints and together surrounding the pipe, in combination with a screw and nut for tightening the clamp, the nut being located inside of one of the members.

2. In a pipe repair clamp, two clamp members united by clincher joints and together surrounding the pipe, in combination with a screw and nut for tightening the clamp, the nut being located inside of one of the members and extended longitudinally of the pipe to distribute the pressure of the nut longitudinally along one clamp member.

SAMUEL M. KASS.